United States Patent [19]

Yokokura et al.

[11] Patent Number: 4,848,907
[45] Date of Patent: Jul. 18, 1989

[54] METHOD OF AND APPARATUS FOR ANALYZING INTERFERENCE FRINGES

[75] Inventors: Takashi Yokokura, Hino; Takashi Gemma; Satoh Takuji, both of Tokyo, all of Japan

[73] Assignee: Tokyo Kogaku Kikai Kabushiki, Tokyo, Japan

[21] Appl. No.: 91,278

[22] Filed: Aug. 31, 1987

[30] Foreign Application Priority Data

Sep. 2, 1986 [JP] Japan .................. 61-206123

[51] Int. Cl.⁴ .................................................. G01B 9/021
[52] U.S. Cl. ...................................... 356/347; 364/525
[58] Field of Search ............... 356/347, 348, 359, 360; 250/550; 364/525, 552; 358/107

[56] References Cited

U.S. PATENT DOCUMENTS 3,642,374 2/1972 Matsumoto et al. .
4,396,289 8/1983 Fantone .

OTHER PUBLICATIONS

A. Ono et al., "Aspherical Mirror Testing Using a CGH with Small Errors" (Applied Optics vol. 24, No. 4, Feb. 1985).
Yatagai et al., "Interferometric Testing with Computer-Generated Holograms: Aberation Balancing Method and Error Analysis" *Applied Optics.*, vol. 17, No. 4, pp. 558-565, 2/78.
Emmel et al., "A New Instrument for Routine Optical Testing of General Aspherics", *Proc. SPIE*, vol. 171, pp. 93-99, 1979.
MacGovern et al., "Computer Generated Holograms for Testing Optical Elements" *Applied Optics,* vol. 10, No. 3, pp. 619-624, 3/71.
B. Dorband et al., "Testing Aspheric Surface with Computer-Generated Holograms: Analysis of Adjustment and Shape Errors" (Applied Optics vol. 24, No. 6, Aug. 1985).
E. K. Hussmann, "A Holographic Interferometer for Measuring Radiation Energy Deposition Profiles in Transparent Liquids" (Applied Optics vol. 10, No. 1, Jan. 1971).

*Primary Examiner*—Davis L. Willis
*Assistant Examiner*—Matthew W. Koren
*Attorney, Agent, or Firm*—Brumbaugh, Graves, Donohue & Raymond

[57] ABSTRACT

A method of analyzing interference fringes for use in a holographic interferometry process for measuring, by using a computer generated hologram, the shape of an object to be examined. The method comprises:

a first step of obtaining a wave surface (xl, yl, zl) of a surface to be measured from measurement interference fringes;

a second step of obtaining a coefficient $A_k$ relative to the wave surface (xl, yl, zl) of the surface, from a coefficient $a_{ij}$ of a series of the object wave which has been obtained based on the hypothesized coordinates on a computer hologram at the time when the computer generated hologram is made, and from a coefficient $b_{ij}$ of a series of the object based on the hypothesized coordinates on the object, the coefficient $A_k$ minimizing the square sum or the maximum value of a function of Xl, Yl, Zl, and a third step of obtaining a shape error from the ideal shape of the object by calculating the function on the basis of the $A_k$.

4 Claims, 4 Drawing Sheets

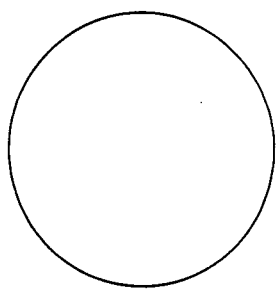
FIG.4(C)  P−V : 0.003λ
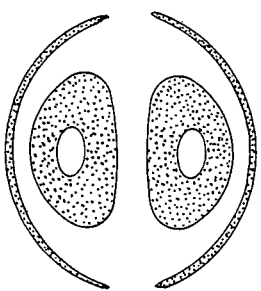
FIG.4(B)  P−V : 1.208λ
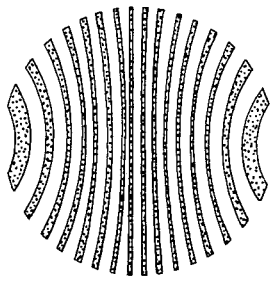
FIG.4(A)  P−V : 8.021λ

METHOD OF AND APPARATUS FOR ANALYZING INTERFERENCE FRINGES

BACKGROUND OF THE INVENTION

1. Field of the Invention

This invention relates to an interference fringe analyzing method and an apparatus for the same for use in a holographic interferometer system which makes use of computer generated holograms, the method and the apparatus being capable of correcting any deviation of a wave surface due to an error in the disposition of an object to be examined or the disposition of a computer generated hologram.

2. Description of the Prior Art

A type of holographic interferometer has been known, which is based on a method of measuring the shape of a surface of an aspherical optical element, which makes uses of, as reference hologram, a so-called "computer generated hologram" made by electron beam writing or the like by calculating a hologram pattern by an electronic computer from an optical set value of a reference aspherical surface; makes light having a wave surface reflected at or transmitted through an aspherical optical element to be examined and diffracted by the reference hologram interfere with reference light; and accurately measures, from the amount and shape of interference fringes thereof, a manufacturing error of the aspherical optical element.

As a method of adjusting the dispositions of the object to be examined and the reference hologram in the holographic interferometer, two methods have been known: one in which both the object and the reference hologram are moved while interference fringes are being observed; and one such as that disclosed in the thesis "Testing aspheric surfaces with computer-generated holograms: analysis of adjustment and shape errors" by B. Dorband et al (Applied Optics, Vol. 24, No. 16 p.p.2604 to 2611) in which fluctuations of the object wave due to inclinations of the reference plane of the holographic interferometer relative to the x- and y-axes, inclinations of the object relative to the X- and Y-axes, an eccentricity or decenter of the object in the X-Y plane, and an eccentricity of the reference hologram in the x-y plane are preliminarily simulated by ray tracing; the difference between a coefficient of the Zernike polynomial in this simulation and a coefficient of the Zernike polynomial at the time when the object and the reference hologram are disposed in the normal positions is obtained; this difference is subtracted as differentiation of the object wave from an observed wave surface.

In the former type of method, namely, a method in which the object and the reference hologram are adjusted while interference fringes are being observed, an interference pattern resulting from an error in the disposition of the object also changes depending upon five components i.e. the eccentricity error of the object in the X-Y plane, the inclination of the object relative to X- and Y- axes, and the defocusing. Therefore, the disposition adjustment in accordance with this method requires a great deal of experience and skill. To effect the adjustment, it is necessary to move the object in a trial-and-error manner, resulting in a prolonged measurement time.

The latter type of method, namely, the method by Dorband et al necessitates a preliminary step of performing ray tracing with respect to eight variables and therefore requires a very large amount of calculation and a very long calculation time for this step. In addition, in this method, the differential coefficient of each of the inclinations of the reference plane and the object, the eccentricity of the object and the eccentricity of the reference hologram has a small degree of independency. For this reason, there is an increased possibility of errors in the calculations of the components if the calculations are performed by the method of least squares. Moreover, it is not possible to perform the calculations for the simulation unless all of the optical dimensions of the ideal shape of the object and the interferometer are given.

SUMMARY OF THE INVENTION

The present invention has been accomplished with a view to eliminating the defects of the conventional methods, and an object of the present invention is to provide an interference fringe analyzing method and an apparatus for the same for use in a holographic interferometer system which are capable of obtaining shape errors from the ideal shape of the object with a small amount of calculation even if there is an error in the disposition of the object or the reference hologram.

To attain the above object, the present invention provides in one of its aspects a method of analyzing interference fringes for use in a holographic interferometry process for measuring, by using a computer generated hologram, the shape of an object to be examined, the method comprising:

a first step of obtaining a wave surface (xl, yl, zl) of a surface to be measured from measurement interference fringes, on the basis of an interference fringe analyzing method or phase scanning method;

a second step of obtaining a coefficient $A_k$ relative to the wave surface (xl, yl, zl) of the surface to be measured, on the basis of the method of least squares or Min-Max method, from a coefficient $a_{ij}$ of a series of the object wave $$\sum_{i=0}^{n} \sum_{j=0}^{i} a_{ij} x^j y^{i-j} \qquad (1)$$

which has been obtained based on the hypothesized coordinates on a computer generated hologram at the time when the computer generated hologram is made, and from a coefficient $b_{ij}$ of a series $$\sum_{i=0}^{n} \sum_{j=0}^{i} b_{ij} x_d^j y_a^{i-j} \qquad (2)$$

of the object wave based on the hypothesized coordinates on the object to be examined, the a coefficient $A_k$ minimizing the square sum or the maximum value of $$Zl - \sum_{k=1}^{13} A_k f_k(xl, yl); \text{ and} \qquad (3)$$

a third step of obtaining a shape error from the ideal shape of the object by calculating the Formula 3 on the basis of the $A_k$ determined in the second step.

The present invention provides in another of its aspects a method of analyzing interference fringes for use in a holographic interferometry process for measuring, by using a computer hologram, the shape of an object to be examined, the method comprising:

a first step of obtaining a wave surface (xl, yl, zl) of a surface to be measured from measurement interference fringes, on the basis of an interference fringe analyzing a method or phase scanning method;

a second step of obtaining a coefficient $A_k$ relative to the wave surface (xl, yl, zl) of the surface to be measured, on the basis of the method of least squares or Min-Max method, from a coefficient $a_{ij}$ of a series of the object wave $$\sum_{i=0}^{n} \sum_{j=0}^{i} a_{ij} x^j y^{i-j} \quad \text{(1)}$$

which has been obtained based on the hypothesized coordinates on a computer generated hologram at the time when the computer generated hologram is made, and from a coefficient $b_{ij}$ of a series $$\sum_{i=0}^{n} \sum_{j=0}^{i} b_{ij} x_d^j y^{i-j} \quad \text{(2)}$$

of the object wave based on the hypothesized coordinates on the object to be examined, the a coefficient $A_k$ minimizing the square sum or the maximum value of $$Zl - \sum_{k=1}^{13} A_k f_k(xl, yl); \text{ and} \quad \text{(3)}$$

a third step of calculating, on the basis of the $A_k$ determined in the second step, a deviation from the computer generated hologram or from the position in which the object to be examined is normally disposed.

The present invention provides still another of its aspects an apparatus for analyzing interference fringes for use in a holographic interferometer for measuring, by using a computer generated hologram, the shape of an object to be examined, the apparatus comprising:

wave surface calculating means for obtaining a wave surface (xl, yl, zl) of a surface to be measured from measurement interference fringes, on the basis of an interference fringe analyzing method or phase scanning method;

coefficient calculating means for obtaining a coefficient $A_k$ relative to the wave surface (xl, yl, zl) of the surface to be measured, on the basis of the method of least squares of Min-Max method, from a coefficient $a_{ij}$ of a series of the object wave $$\sum_{i=0}^{n} \sum_{j=0}^{i} a_{ij} x^j y^{i-j} \quad \text{(1)}$$

based on the hypothesized coordinates on a computer generated hologram which has been obtained at the time when the computer generated hologram is made, and from a coefficient $b_{ij}$ of a series of the object wave $$\sum_{i=0}^{n} \sum_{j=0}^{i} b_{ij} x_d^j y_a^{i-j} \quad \text{(2)}$$

based on the hypothesized coordinates on the object to be examined, the a coefficient $A_k$ minimizing the square sum or the maximum value of $$Zl - \sum_{k=1}^{13} A_k f_k(xl, yl); \text{ and} \quad \text{(3)}$$

shape error calculating means for obtaining a shape error from the ideal shape of the object by calculating the Formula (3) on the basis of the $A_k$ obtained by the coefficient calculating means.

The present invention provides in a further of its aspect an apparatus for analyzing interference fringes for use in a holographic interferometer for measuring, by using a computer generated hologram, the shape of an object to be examined, the apparatus comprising:

wave surface calculating means for obtaining from measurement interference fringes a wave surface (xl, yl, zl) of a surface to be measured, on the basis of an interference fringe analyzing method or phase scanning method;

coefficient calculating means for obtaining a coefficient $A_k$ relative to the wave surface (xl, yl, zl) of the surface to be measured, on the basis of the method of least squares or Min-Max method, from a coefficient $a_{ij}$ of a series of the object wave $$\sum_{i=0}^{n} \sum_{j=0}^{i} a_{ij} x^j y^{i-j} \quad \text{(1)}$$

which has been obtained based on the hypothesized coordinates on a computer generated hologram at the time when the computer generated hologram is made, and from a coefficient $b_{ij}$ of a series of the object wave $$\sum_{i=0}^{n} \sum_{j=0}^{i} b_{ij} x_d^j y_a^{i-j} \quad \text{(2)}$$

based on the hypothesized coordinates on the object to be examined, the a coefficient $A_k$ minimizing the square sum or the maximum value of $$Zl - \sum_{k=1}^{13} A_k f_k(xl, yl); \text{ and} \quad \text{(3)}$$

deviation calculating means for obtaining a deviation from the computer generated hologram or from the position in which the object to be examined is normally disposed, by calculating Formula (3) the basis of the $A_k$ obtained by the coefficient calculating means.

The present invention enables a larger degree of remaining disposition error to be corrected compared with the conventional method, and the present invention can provide a holographic interferometer in which the manner of disposition adjustment of the object is simple as well as calculations for correction.

Formulas (1) and (2) are calculations which are necessary when the computer hologram is made, and the present invention utilizes the coefficients $a_{ij}$ and $b_{ij}$ of these formulas to correct disposition errors, thereby eliminating the necessity of a special ray-tracing simulation.

Moreover, only the coefficients $a_{ij}$ and $b_{ij}$ of Formulas (1) and (2) which represent the object wave may be given to obtain a shape error, and it is possible to obtain any shape error even if the optical dimensions of the interferometer and the ideal shape of the object are not given.

The above and other object and features of the present invention will become apparent from the following descriptions of preferred embodiments made with reference to the accompanying drawings.

BRIEF DESCRIPTION OF THE DRAWINGS

FIGS. 4(A), 4(B) and 4(C) are diagrams showing the change in interference fringes when a disposition error is corrected.

DETAILED DESCRIPTION OF THE PREFERRED EMBODIMENT

Figure 1:
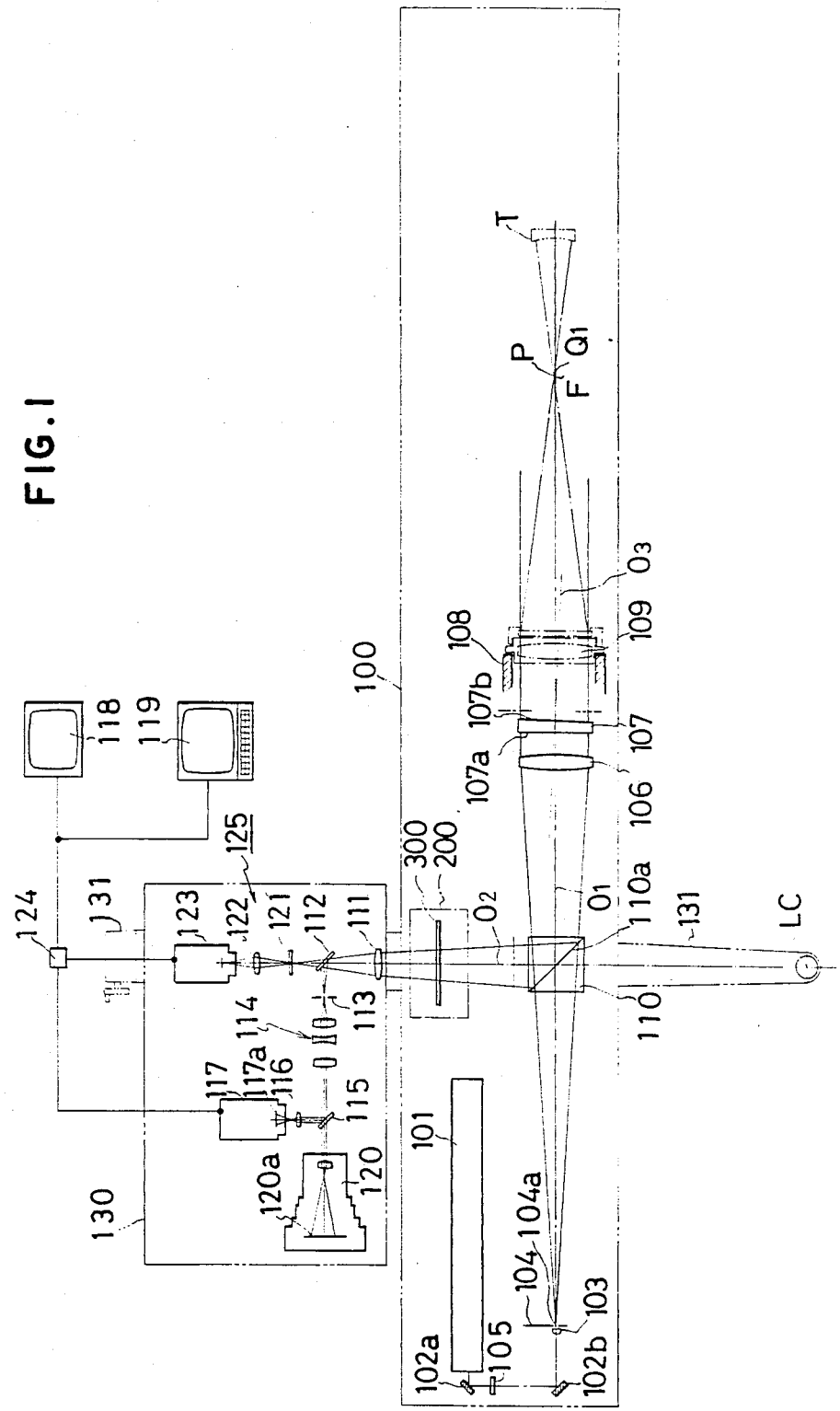
FIG. 1 is an optical path diagram of the optical disposition of a holographic interferometer in accordance with the present invention.

An embodiment of the present invention will be described below with reference to the accompanying drawings. FIG. 1 shows the entire optical system of a holographic interferometer in accordance with the present invention. A light from a laser 101 or a light source is condensed by a condenser lens 103 after the optical path of this light has been changed by mirrors 102a and 102b. A pinhole reticle plate 104 having a pinhole 104a is disposed in the vicinity of this condensing point. Dispersion light which has passed through this pinhole 104a acts in such a manner that it has a secondary light source at the pinhole 104a. A quarter-wave retardation plate 105 is disposed between the mirrors 102a and 102b.

A collimator lens 106 is disposed so as to position its focal point at the pinhole 104a. A beam emitted from the pinhole 104a is changed into a parallel beam by the collimator lens 106. A flat reference plate 107 is disposed at the rear of the collimator lens 106. The flat reference plate 107 is disposed in such a manner that its front flat surface 107a is perpendicular to a system optical path (collimator optical path) $0_1$. A rear flat surface 107b of the flat reference plate 107 is slanted at a very small angle relative to the front flat surface 107a so that interference light which is caused between light reflected by the front flat surface 107a and light reflected by the rear flat surface 107b does not affect the measurement.

If an object T to be examined is an object having a concave surface such as an aspheric concave mirror, a reference lens 109 is disposed at the rear of the flat reference plate 107 by being mounted on a tube 108 of the system. The parallel beam which has been transmitted through the flat reference plate 107 is changed into a convergent beam and is converged at a point P. It is thereafter changed into dispersion light again and is introduced to the aspherical concave mirror T.

The object light reflected by the object T and the reference light reflected by the front flat surface 107a of the flat reference plate 107 are introduced into a prism beam splitter 110 which is disposed between the pinhole reticle plate 104 and the collimator lens 106 and which has a half mirror surface 110a which is inclined relative to the optical axis $0_1$. The object light and the reference light are both reflected by the half mirror surface 110a and are introduced into a reference hologram 300 which is supported by a hologram standard holder 200.

The laser 101, the mirrors 102a and 102b, a quarter-wave retardation plate 105, the pinhole reticle 104, the beam splitter 110, the collimator lens 106, the flat reference plate 107, the reference lens 109, the object T and the reference hologram holder 200 are mounted in common on an optical bench 100.

The light which has been transmitted through the reference hologram 300 is introduced via an imaging lens 111 and a half mirror 112 and is imaged on a spatial filter 113 which is adapted for selectively taking out one of the reference light and the object light which has been diffracted at the hologram prototype 300 or the other one of them which has not been diffracted at the reference hologram 300. More concretely, as in the case of a conventional Fizeau interferometer, the spatial filter 113 selects and takes out, for example, only zero order reference light of the reference light from the flat reference plate 107, which has not been diffracted at the reference hologram 300, and first order object light of the object light from the object T, which has been diffracted at the reference hologram 300, while cutting off diffracted light of the reference light and the zero order and high-order more than second-order diffracted light of the object light.

The object light and the reference light which have been filtered by the spatial filter 113 are introduced via a zoom lens 114, a half mirror 115 and an imaging lens 116 so as to form an interference pattern of the reference light and the object light on an image plane 117a of a TV camera 117. The picked-up image obtained by the TV camera 117 is transmitted to an interference fringe analyzing apparatus 119 which is constituted by a monitor television 118 and a personal computer. The reference light and the object light which have been transmitted through the half mirror 115 form an interference pattern on a film 120a of an instantaneous-development camera 120. This interference pattern is the same as that formed on the image-pickup plane 117a and is recorded on the film 120a. A part of the light which has passed through the imaging lens 111 is transmitted through the half mirror 112 and is imaged on a reticle plate 121 which is disposed so that its line corresponds to the optical axis. The image on the reticle plate 121 is picked up by a TV camera 123 through an image-pickup lens 122 and is displayed on a monitor 118 via a switching-over circuit 124. The reticle plate 121, the image-pickup lens 122, the TV camera 123 and the monitor 118 constitute an alignment optical system 125 whereby the object T is set in the measurement optical path.

The imaging lenses 111 and 116, the half mirrors 112 and 115, the spatial filter 113, the zoom lens 114, the image-pickup lens, the TV cameras 117 and 123 and the camera 120 are mounted on an optical bench 130. This optical bench 130 is fixedly mounted on an arm 131 which turns about a point LC conjugated with the exit pupil EP of the synthetic optical system constituted by the collimator lens 107 and the reference lens 109 when driven by a known micro-feed mechanism 131 for adjustment of the OFF-axis angle. If the object T is a flat object, the reference lens 109 is not necessary. In that case, the center LC of the turning movement is in a position conjugated with the exit pupil of the collimator lens 107

Figure 2:
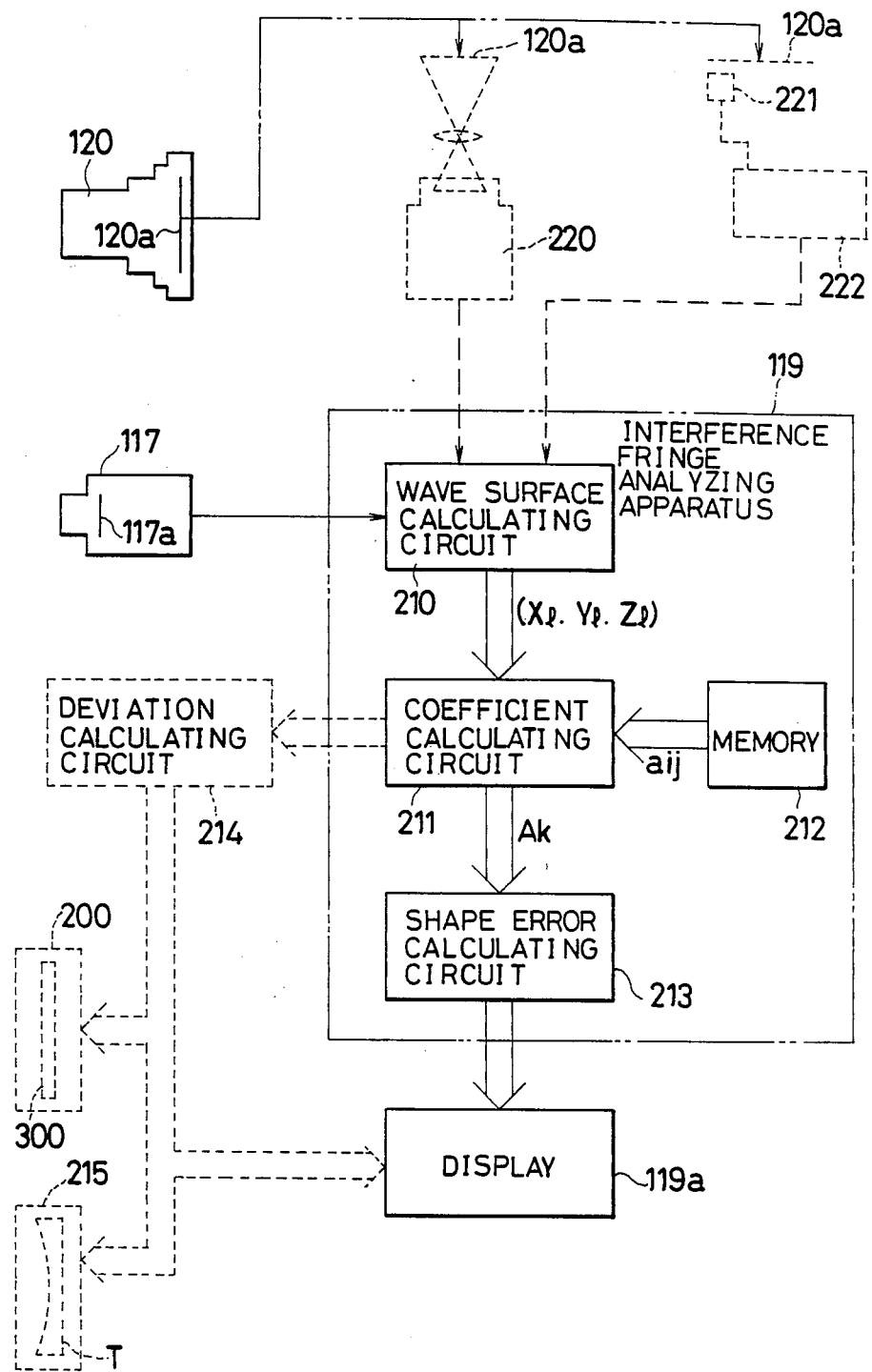
FIG. 2 is a block diagram of the construction of an interference fringe analyzing apparatus in accordance with the present invention.
Figure 3A:
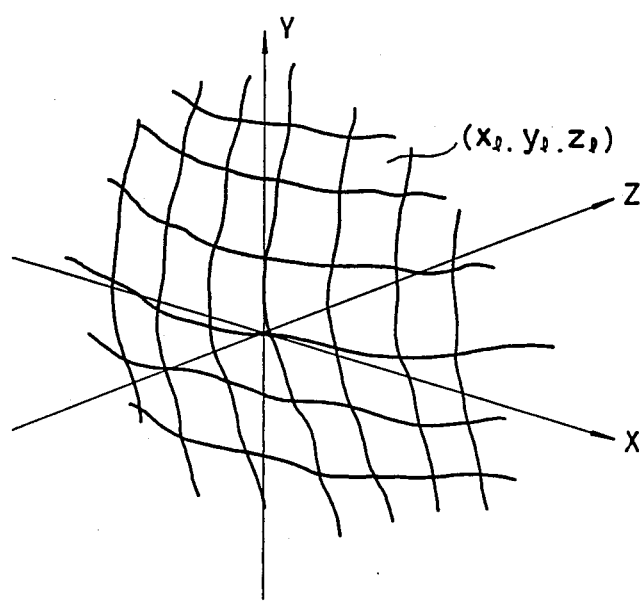
FIG. 3(A) is a schematic diagram of a wave surface at a surface to be measured.

FIG. 2 is a block diagram showing the constitution of the interference fringe analyzing apparatus 119. From an interference fringe picture signal for measuring the object supplied from the TV camera 117, a wave surface (xl, yl, zl) at the surface to be measured, such as that shown in FIG. 3(A) is obtained by a wave surface calculating circuit 210 and by using a known interference fringe analyzing method or a known phase scanning method. From this wave surface, from a coefficient $a_{ij}$ of a series of the object wave:

$$\sum_{i=0}^{n} \sum_{j=0}^{i} a_{ij} x^j y^{i-j} \quad (1)$$

which was obtained based on the hypothesized coordinates on a computer generated hologram 300 when the computer generated hologram 300 was made and which have been stored in a memory 212 consisting of a ROM or the like, and from a coefficient $b_{ij}$ of a series of the object wave:

$$\sum_{i=0}^{n} \sum_{j=0}^{i} b_{ij} x_a^j y_a^{i-j} \quad (2)$$

the hypothesized coordinates on the object to be examined, a coefficient $A_k$ which minimizes the square sum or the maximum value of $$Zl - \sum_{k=1}^{13} A_k f_k(xl, yl); \text{ and} \quad (3)$$

(where l=1 to m) is obtained by a coefficient calculating circuit 211 on the basis of a known method of least squares or a known Min-Max method.

With respect to the function $f_k(x, y)$, terms:

$f_1(x, y) = x$, $f_2(x, y) = y$ represent the inclination of the reference hologram computer generated hologram 300, and a term:

$f_3(x, y) = x^2 + y^2$ represents the deviation of the reference hologram 300 in the direction of the z-axis.

A term:

$$f_4(x, y) = \sum_{i=0}^{n} \sum_{j=0}^{i} j a_{ij} x^{j-1} y^{i-j}$$

represents the eccentricity of the reference hologram 300 in the x-direction.

A term:

$$f_5(x, y) = \sum_{i=0}^{n} \sum_{j=0}^{i} (i-j) a_{ij} x^j y^{i-j-1}$$

represents the eccentricity of the reference hologram 300 in the y-direction.

A term:

$$f_6(x, y) = \sum_{i=0}^{n} \sum_{j=0}^{i} a_{ij} \{(i-j)x^2 - jy^2\} x^{j-1} y^{i-j-1}$$

represents the rotation of the reference hologram 300 about the z-axis.

Terms: $f_7(x, y) = x_a$, $f_8(x, y) = y_a$ represents the inclination of the object T, and a term:

$f_9(x, y) = x_a^2 + y_a^2$ represents the deviation of the object T in the direction of the z-axis.

A term:

$$f_{10}(x, y) = \sum_{i=0}^{n} \sum_{j=0}^{i} j b_{ij} x_a^{j-1} y_a^{i-j}$$

represents the eccentricity of the object T in the x-direction.

A term:

$$f_{11}(x, y) = \sum_{i=0}^{n} \sum_{j=0}^{i} (i-j) b_{ij} x_a^j y_a^{i-j-1}$$

represents the eccentricity of the object T in the y-direction.

A term:

$$f_{12}(x, y) = \sum_{i=0}^{n} \sum_{j=0}^{i} b_{ij} \{(i-j)x_a^2 - jy_a^2\} x^{j-1} y^{i-j}$$

represents the rotation of the object T about the z-axis.

$f_{13}(x, y) = c$ (c: constant) represents a constant term.

$f_7(x, y)$ to $f_{12}(x, y)$ are represented by the coordinate $(X_a, Y_a)$ on the object. This necessitates the conversion of the coordinate (x, y) on the hologram into the coordinate $(x_a, y_a)$ on the object. The coordinate $(x_a, y_a)$ may be expressed by, for example, series:

$$x_a = \sum_{i=0}^{n} \sum_{j=0}^{i} c_{ij} x^j y^{i-j}$$

$$y_a = \sum_{i=0}^{n'} \sum_{j=0}^{i} c_{ij} x^j y^{i-j}$$

similar to that of the object wave by using the data at the time of preparation of the computer generated hologram, the coefficients $c_{ij}$ and $d_{ij}$ thereof being previously stored in the memory 212. These coefficients may be used to facilitate the above conversion.

Figure 3B:
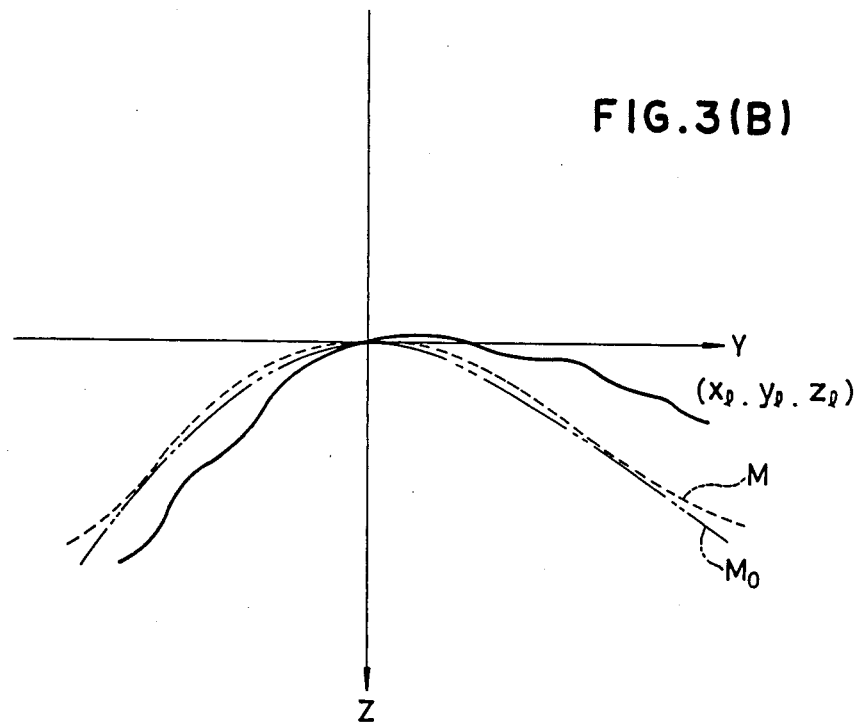
FIG. 3(B) is a cross-sectional view taken along the XZ plane, schematically showing the relationship between a wave surface at the surface to be measured, a wave surface without any disposition error, and the ideal wave surface.

From $$Zl - \sum_{k=1}^{13} A_k f_k(xl, yl) \quad (3)'$$

having a coefficient $A_k$ obtained by the coefficient calculating circuit 211, a shape error between an ideal wave surface $M_0$ and a wave surface M exhibiting no disposition error as shown in FIG. 3B is calculated by a shape error calculating circuit 213, and the results are displayed by a display device.

If the object T exhibits a rotation symmetry about its optical axis and if the off-axis angle is small, contribution of the terms $f_6(x, y)$ and $f_{12}(x, y)$ of the third formula is negligible. Therefore, only the terms $f_1$ to $f_5$, $f_7$ to $f_{11}$, and $f_{13}$ may be calculated.

If the reference hologram has been disposed accurately, contribution of the terms $f_1$ to $f_6$ of the third formula is negligible so that only the terms $f_7$ to $f_{13}$ may be calculated.

Conversely, if the object T has been disposed accurately, contribution of the terms $f_7$ to $f_{12}$ of the third formula is negligible so that only the terms $f_1$ to $f_6$ and $f_{13}$ may be calculated.

FIG. 4(A) shows an interference pattern displayed when an aspherical object (having an ideal shape) exhibiting a rotation symmetry is disposed with a certain disposition error. FIG. 4(B) shows an interference pattern displayed when the terms $f_7$ and $f_9$ and $f_{13}$ of Formula 3, namely, the inclination of the object T and the deviation of the object T in the direction of the z-axis are corrected. FIG. 4(C) further shows an interference pattern displayed when the terms $f_{10}$ and $f_{11}$, namely, the deviations of the object T in the x-direction and in the y-direction are corrected. As is understood from FIG. 4, it is possible to reduce the difference between the peak and the valley (P-V value) of the interference fringes to $0.003\lambda$ or almost zero, as shown in FIG. 3(C), by considering the terms $f_7$ to $f_{13}$. However, it is assumed in this case that the reference hologram 300 is disposed without any disposition error and, therefore the term $f_6$ is not considered.

Even if linear approximation based on differentiation is not effected when the extents of movement of the object and the reference hologram are large, it is possible to move the object and the reference hologram to positions in the vicinity of the normal positions on the basis of the display of the coefficients $A_1$ to $A_{12}$ or the value of the spatial position of the object converted from these coefficients by the deviation calculating circuit 214 and displayed by the display device 119a, since the coefficients $A_1$ to $A_{12}$ of each term of the second formula substantially represent the extent of deviation of the object. If this operation is repeated one or more times, the linear approximation becomes possible so that the accurate shape error can be obtained from Formula ③ '.

Information on the spatial position of the object from the deviation calculating circuit 214 on the basis of the coefficients $A_1$ to $A_{12}$ may be supplied as signal outputs to the reference hologram holder 200 or an object holder 215, and this information is used to drive the moving system of each holder, thereby automatically positioning the object In the above-described embodiment, interference fringe picture signals from the TV camera 117 are directly used to perform wave form calculations. However, a photograph 120a taken by the camera 120 may be photographed by using another TV camera 220 so as to utilize picture signals supplied by this camera, or interference fringes on the photograph 120a may read out by a digitizer 221 and temporarily recorded in a memory 222 so that digital information thereof can be utilized to perform wave calculations.

We claim:

1. A method of analyzing interference fringes for use in a holographic interferometry process for measuring, by using a computer generated hologram, the shape of an object to be examined, said method comprising:

a first step of obtaining a wave surface (xl, yl, zl) of a surface to be measured from measurement interference fringes, on the basis of an interference fringe analyzing method or phase scanning method;

a second step of obtaining a coefficient $A_k$ relative to said wave surface (xl, yl, zl) of said surface to be measured, on the basis of the method of least squares or Min-Max method, from a coefficient $a_{ij}$ of a series of the object wave $$\sum_{i=0}^{n}\sum_{j=0}^{i} a_{ij}x_d^j y_a^{i-j} \qquad \text{①}$$

which has been obtained based on the hypothesized coordinates on a computer generated hologram at the time when said computer generated hologram is made, and from a coefficient $b_{ij}$ of a series of the object wave $$\sum_{i=0}^{n}\sum_{j=0}^{i} b_{ij}x_d^j y_a^{i-j} \qquad \text{②}$$

based on the hypothesized coordinates on said object to be examined, said a coefficient $A_k$ minimizing the square sum or the maximum value of $$Zl - \sum_{k=1}^{13} A_k f_k(xl, yl); \text{ and} \qquad \text{③}$$

a third step of obtaining a shape error from the ideal shape of said object by calculating said Formula ③ on the basis of said $A_k$ determined in said second step.

2. A method of analyzing interference fringes for use in a holographic interferometry process for measuring, by using a computer generated hologram, the shape of an object to be examined, said method comprising:

a first step of obtaining a wave surface (xl, yl, zl) of a surface to be measured from measurement interference fringes, on the basis of an interference fringe analyzing method or phase scanning method;

a second step of obtaining a coefficient $A_k$ relative to said wave surface (xl, yl, zl) of said surface to be measured, on the basis of the method of least squares or Min-Max method, from a coefficient $a_{ij}$ of a series of the object wave $$\sum_{i=0}^{n}\sum_{j=0}^{i} a_{ij}x_d^j y_a^{i-j} \qquad \text{①}$$

which has been obtained based on the hypothesized coordinates on a computer generated hologram at the time when said computer generated hologram is made, and from a coefficient $b_{ij}$ of a series of the object wave $$\sum_{i=0}^{n}\sum_{j=0}^{i} b_{ij}x_d^j y_a^{i-j} \qquad \text{②}$$

based on the hypothesized coordinates on said object to be examined, said a coefficient $A_k$ minimizing the square sum or the maximum value of $$Zl - \sum_{k=1}^{13} A_k f_k(xl, yl); \text{ and} \qquad \text{③}$$

a third step of calculating, on the basis of said $A_k$ determined in said second, a deviation from said computer generated hologram or from the position in which said object to be examined is normally disposed.

3. An apparatus for analyzing interference fringes for use in a holographic interferometer for measuring, by using a computer generated hologram, the shape of an object to be examined, said apparatus comprising:

wave surface calculating means for obtaining a wave surface (xl, yl, zl) of a surface to be measured from measurement interference fringes, on the basis of an interference fringe analyzing method or phase scanning method;

coefficient calculating means for obtaining a coefficient $A_k$ relative to said wave surface (xl, yl, zl) of said surface to be measured, on the basis of the method of least squares or Min-Max method, from a coefficient $a_{ij}$ of a series of the object wave $$\sum_{i=0}^{n} \sum_{j=0}^{i} a_{ij} x^j y^{i-j} \qquad (1)$$

which has been obtained based on the hypothesized coordinates on a computer hologram at the time when said computer generated hologram is made, and from a coefficient $b_{ij}$ of a series of the object wave $$\sum_{i=0}^{n} \sum_{j=0}^{i} b_{ij} x_d^j y_a^{i-j} \qquad (2)$$

based on the hypothesized coordinates on said object to be examined, said a coefficient $A_k$ minimizing the square sum or the maximum value of $$Zl - \sum_{k=1}^{13} A_k f_k(xl, yl); \text{ and} \qquad (3)$$

shape error calculating means for obtaining a shape error from the ideal shape of said object by calculating said Formula (3) on the basis of said $A_k$ obtained by said coefficient calculating means.

4. An apparatus for analyzing interference fringes for use in a holographic interferometer for measuring, by using a computer generated hologram, the shape of an object to be examined, said apparatus comprising:

wave surface calculating means for obtaining a wave surface (xl, yl, zl) of a surface to be measured from measurement interference fringes, on the basis of an interference fringe analyzing method or phase scanning method;

coefficient calculating means for obtaining a coefficient $A_k$ relative to said wave surface of said surface to be measured, on the basis of the method of least squares or Min-Max method, from a coefficient $a_{ij}$ of a series of the object wave $$\sum_{i=0}^{n} \sum_{j=0}^{i} a_{ij} x^j y^{i-j} \qquad (1)$$

which has been obtained based on the hypothesized coordinates on a computer hologram at the time when said computer generated hologram is made, and from a coefficient $b_{ij}$ of a series of the object wave $$\sum_{i=0}^{n} \sum_{j=0}^{i} b_{ij} x_d^j y_a^{i-j} \qquad (2)$$

based on the hypothesized coordinates on said object to be examined, said a coefficient $A_k$ minimizing the square sum or the maximum value of $$Zl - \sum_{k=1}^{13} A_k f_k(xl, yl); \text{ and} \qquad (3)$$

deviation calculating means for obtaining a deviation from said computer generated hologram or from the position in which said object to be examined is normally disposed, by calculating said Formula (3) on the basis of said $A_k$ obtained by said coefficient calculating means.

* * * * *

UNITED STATES PATENT AND TRADEMARK OFFICE
CERTIFICATE OF CORRECTION

PATENT NO. : 4,848,907
DATED : July 18, 1989
INVENTOR(S) : Takashi Yokokura et al.

It is certified that error appears in the above-identified patent and that said Letters Patent is hereby corrected as shown below:

First page, Item 75, "Satoh Takuji" should read --Takuji Satoh--;

Column 3, line 37, after "provides" insert --in--;
Column 6, lines 7-8, "quaterwave" should read --quarterwave--;
Column 6, line 64, "107" should read --106--;
Column 7, line 2, "107" should read --106--;
Column 8, line 30, that portion of the formula reading "n" should read --n'--;
Column 10, line 56, after "second" insert --step--;
Column 12, line 5, after "surface" (1st occurrence), insert --($x\ell$, $y\ell$, $z\ell$)--.

Signed and Sealed this

Twenty-fifth Day of September, 1990

*Attest:*

HARRY F. MANBECK, JR.

*Attesting Officer*  *Commissioner of Patents and Trademarks*